(No Model.)
R. P. COUGHLIN.
MANUFACTURE OF ARTIFICIAL MARBLE FOR BATH TUBS, &c.
No. 269,389. Patented Dec. 19, 1882.
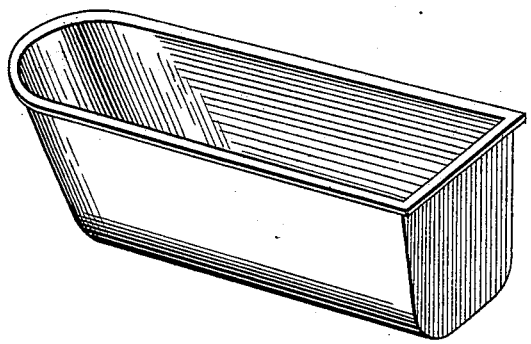
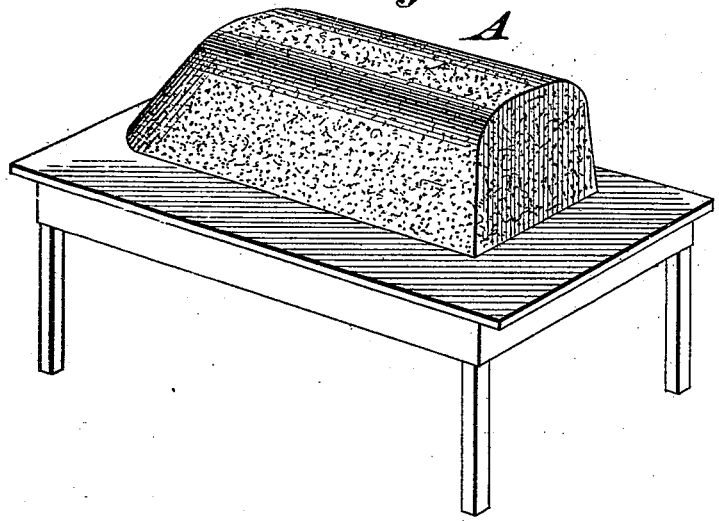

UNITED STATES PATENT OFFICE.

REESE P. COUGHLIN, OF CINCINNATI, OHIO.

MANUFACTURE OF ARTIFICIAL MARBLE FOR BATH-TUBS, &c.

SPECIFICATION forming part of Letters Patent No. 269,389, dated December 19, 1882.

Application filed September 23, 1882. (No model.)

*To all whom it may concern:*

Be it known that I, REESE P. COUGHLIN, a citizen of the United States, and a resident of Cincinnati, in the county of Hamilton and State of Ohio, have invented certain new and useful Improvements in the Manufacture of Artificial Marble for Bath-Tubs and other Purposes, of which the following is a specification.

My invention relates to the manufacture of bath-tubs and other articles of commerce, also to the process of manufacturing the same; and, further, it consists of a new mastic from which the articles are made, all of which will be fully set forth in the following description.

Figure 1 is a perspective view of a bath-tub made by my process. Fig. 2 is a perspective view of a mold on which the same is made.

My articles are manufactured from a cement known as "Keene's White Cement," alum, and water; or, instead of alum, either Glauber's salt or Epsom salts, or sulphate of manganese, or any two or all of these articles, may be used in the composition to form the first coating, and sand or other materials for additional coats.

The process of preparing the composition is as follows: Take water, say, forty gallons; alum, one pound, (or, if the other substitutes for alum are used, the same quantity.) Dissolve the mineral in the water. After they are fully dissolved stir in the cement, using a sufficient quantity to form a plastic or mortar of the consistency of tempered potter's clay.

To make a bath-tub, take a mold of the desired conformation of the bath-tub and place the larger or wider edge down. A, Fig. 2, represents such a mold. With a trowel or other tool apply a coating of the mastic to the surface of the mold, say, one-quarter of an inch in thickness. After the first coat is applied and partially set the remaining coatings are made by using a coarse grade of cement or adding fine sand and marble-dust—say from one-third to one-half—may be used to cheapen the cost of the material and to strengthen the tub. After the article is completed and the cement thoroughly set, or the water fixated, which usually requires about twenty-four hours, the tub is removed, and any imperfection can be removed by honing and filling any cracks or interstices with fresh mastic, which will readily adhere to the semi-fixated material and form a continuous surface. A very fine gloss or polish can be obtained by honing with boiled linseed-oil and turpentine, which fills the pores and prevents the absorption of water, making a very durable article. Instead of the oil, any suitable glazing material can be used to prevent the water from entering the pores of the material and injuring the structure. A bath-tub thus made exceeds marble in its luster and appearance. It does not chip or scale as readily as marble, and no seams or flaws exist.

Another feature of this plastic is important. As the colors will not fade or run, hence the durability is equal to marble itself.

I claim—

1. The process of making a bath-tub by coating a mold having the contour of the bath-tub with a plastic formed of cement, alum, and water, and when partially set combined with one or more outer coats formed of a plastic made of cement, alum, sand, and water, or their described equivalents.

2. A bath-tub made of two or more coatings of cement, alum, and water and sand, and finished by honing the surfaces in linseed-oil or its described equivalents, substantially as herein set forth.

In testimony whereof I have hereunto set my hand in the presence of two subscribing witnesses.

REESE P. COUGHLIN.

Witnesses:
JNO. E. JONES,
JNO. E. WILES.